J. R. GAMMETER.
SHODDY STRAINER.
APPLICATION FILED JULY 22, 1910.
1,094,892.
Patented Apr. 28, 1914.
3 SHEETS—SHEET 2.
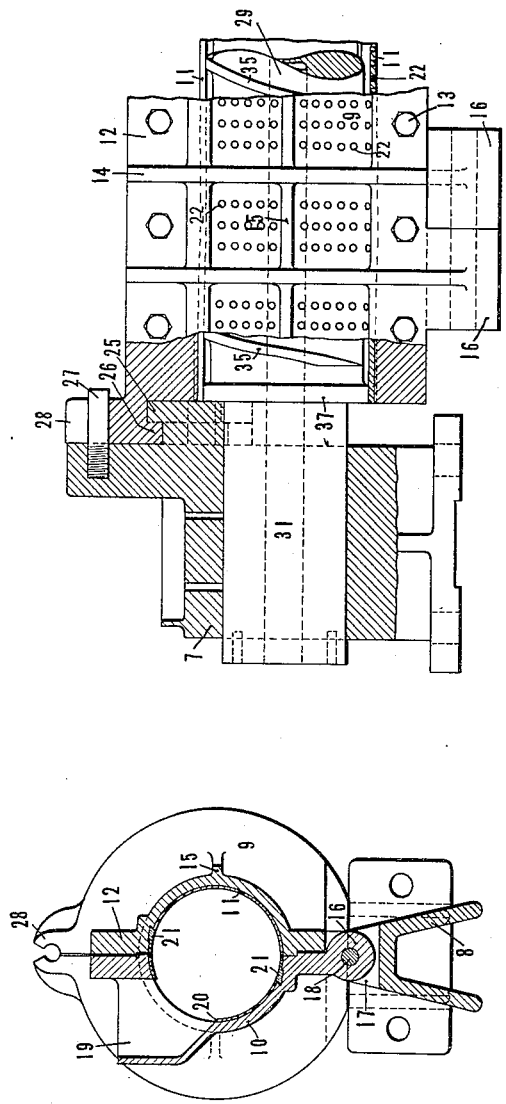
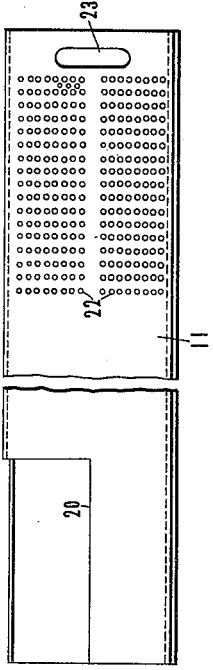

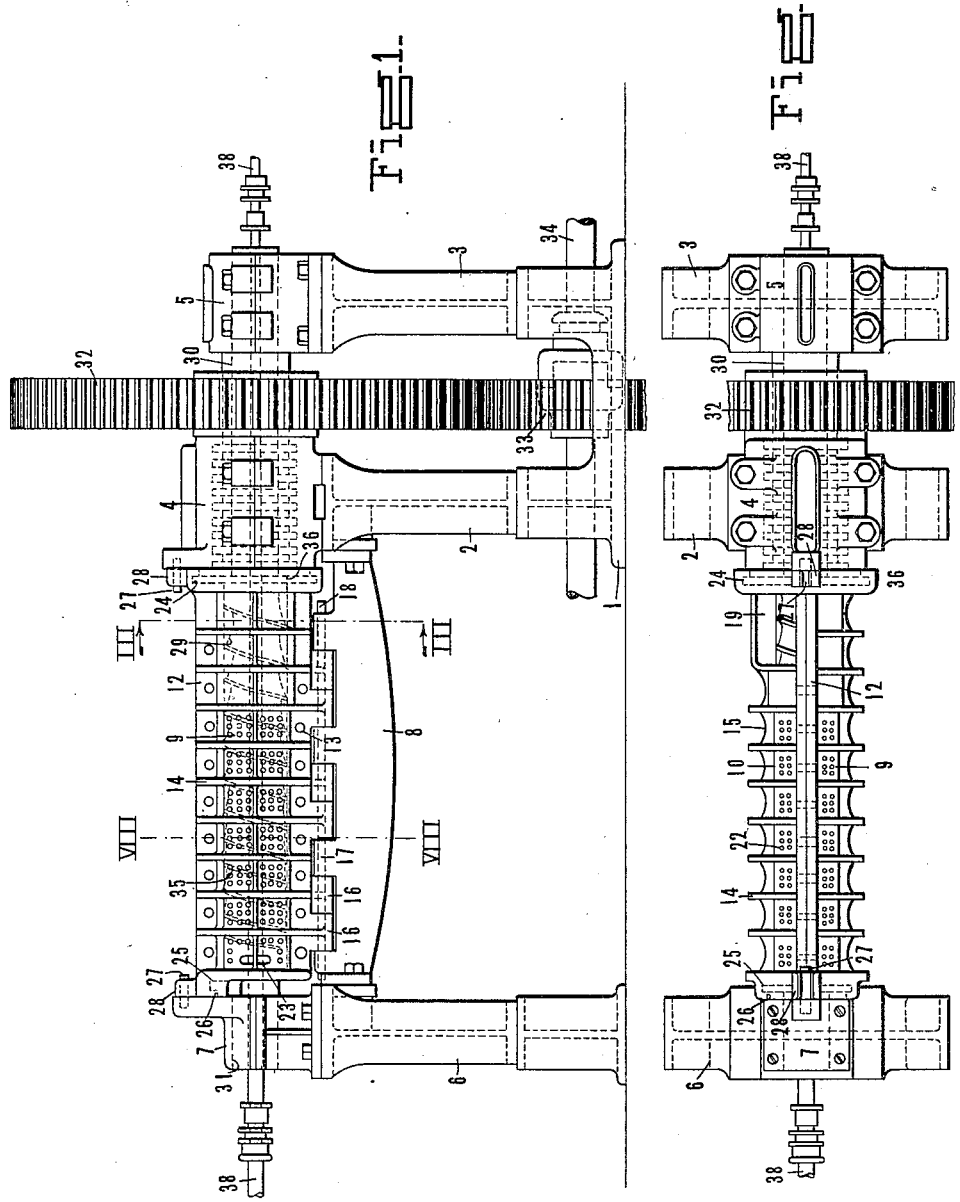

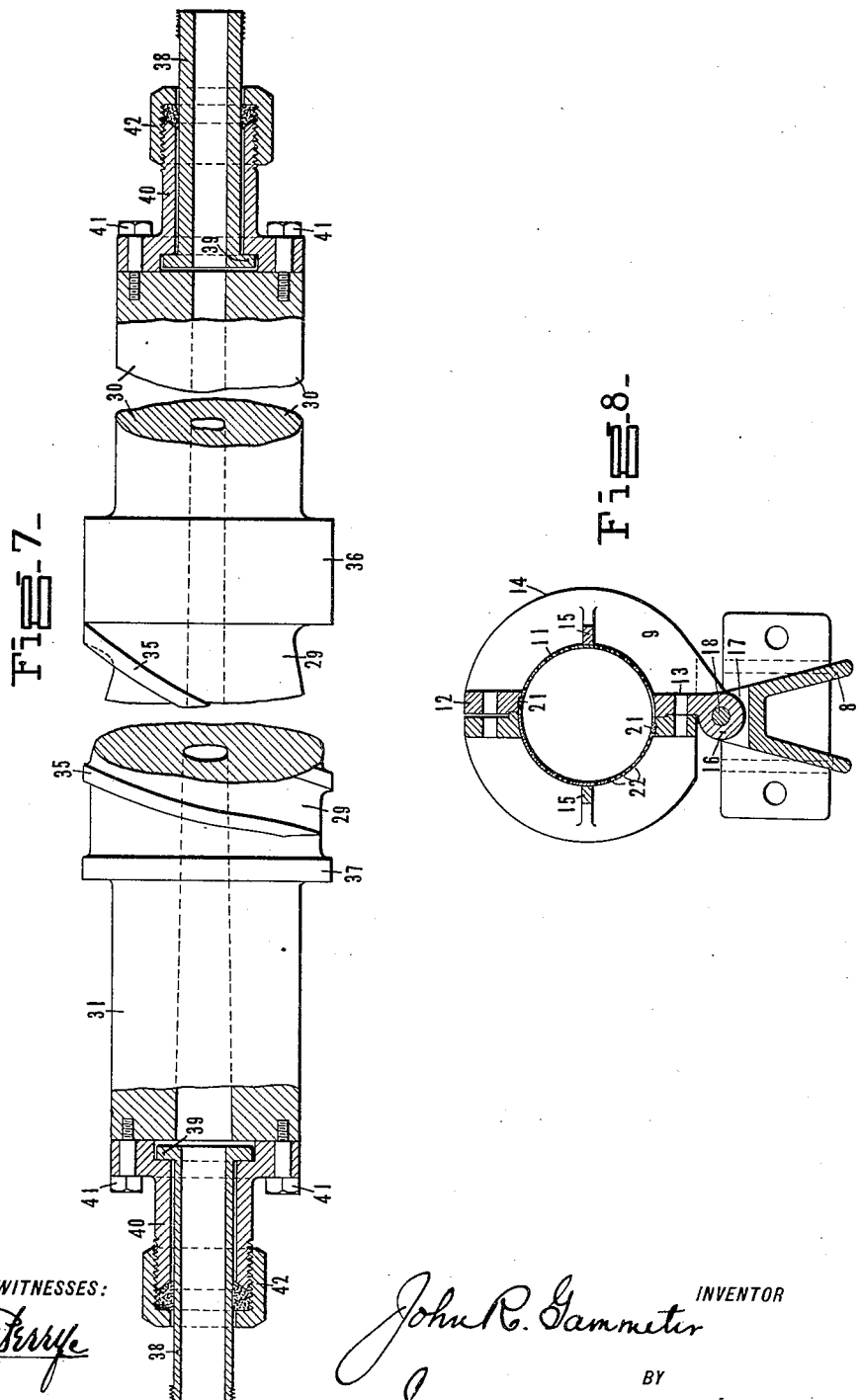

UNITED STATES PATENT OFFICE.

JOHN R. GAMMETER, OF AKRON, OHIO, ASSIGNOR, BY MESNE ASSIGNMENTS, TO THE B. F. GOODRICH COMPANY, A CORPORATION OF NEW YORK.

SHODDY-STRAINER.

1,094,892.     Specification of Letters Patent.    Patented Apr. 28, 1914.

Application filed July 22, 1910. Serial No. 573,171.

*To all whom it may concern:*

Be it known that I, JOHN R. GAMMETER, a citizen of the United States, residing in the city of Akron, county of Summit, and State of Ohio, have invented certain new and useful Improvements in Shoddy-Strainers, of which the following is a specification.

My invention relates to an improved machine for straining impurities from masses of plastic or viscous material or the like, and is designed primarily for the straining of small pieces of metal or other impurities from reclaimed rubber or shoddy, as it is called.

In machines of this nature as heretofore constructed, the material to be strained has been caused to pass through a chamber of considerable length, a strainer of comparatively small area being provided usually at one end of the chamber. The material under great pressure is, therefore, required to travel through a considerable distance, and is emitted but slowly on account of the small area of the strainer. The pressure and the friction of the material against the walls of the chamber, and where a screw is used, the churning of the same through the material generate great heat, which, if the machine is run for any considerable length of time, will raise the temperature of the material to such a point as to seriously damage the chemical composition thereof.

It is an object of my invention to overcome these several difficulties, and I accomplish the same primarily by providing a much larger number of outlets for the strained material, these out-lets being preferably distributed throughout the length of the chamber. In this manner the purer portions of the material are permitted to flow out almost immediately after entering the chamber, while the impure portions are worked along the chamber, the rubber being gradually strained out and the impurities finally finding their way to the end of the chamber, where means are preferably provided for their removal. My invention also contemplates the improvement of a number of the structural details of a machine of this character.

In the accompanying drawings, which form a part of this specification, Figure 1 is a side elevation of a preferred form of machine embodying my invention; Fig. 2 is a plan view of the same; Fig. 3 is a section taken on line III—III of Fig. 1; Fig. 4 is a detail view partly in side elevation and partly in section showing one of the end bearings and the means for securing the strainer cage thereto; Fig. 5 is a side elevation, and Fig. 6 is a transverse section of the strainer; Fig. 7 is a detail side elevation of the screw, parts being shown in section, and a portion of the screw being broken away; Fig. 8 is a section on line VIII—VIII of Fig. 1.

Referring to the drawings in detail, at one end of the machine is a base-plate 1 from which rises a pair of standards 2 and 3, upon the upper ends of which, respectively, are mounted journal boxes 4 and 5. At the other end of the machine is a standard 6 carrying a journal box 7. Connecting the standards 2 and 6 is a supporting beam 8, to which are hinged a pair of skeleton frames or cage members 9 and 10 which inclose and support the perforated pipe or strainer 11. The cage members comprise longitudinal bars 12 having registering holes through which bolts 13 are passed to secure the members together, the longitudinal bars being connected by circumferential ribs 14, which are in turn preferably braced by longitudinal webs 15. The lower bars 12 are provided with eyes 16 which register with eyes 17 formed upon the supporting beam 8, a pintle 18 being passed through the several eyes. It will thus be seen that the members 9 and 10 may be separated and swung about the pintle when it is desired to remove or replace the strainer, as will be necessary from time to time when the latter becomes worn, or for any other reason. The frame member 10 is provided with a hopper 19 which registers with an opening 20 in the strainer, a charge opening being thus provided. The strainer is made in two sections, which are locked in position within the cage by means of the longitudinal keys 21 carried by grooves in the interior of the cage. The sections of the strainer are perforated with a great number of holes, as indicated at 22, one or more large openings 23 being provided at the extreme end of the strainer to permit the escape of the surplus stock, carrying with it the impurities which have not passed through the small holes in the remainder of the strainer.

The cage is preferably locked directly to the bearings 4 and 7, the bearing 4 being provided with a flange 24 which is received in an annular groove formed near the end of the cage, while the bearing 7 carries a segmental flange 25 which is engaged by grooved portions 26 of the cage members.

As will be obvious, when the cage members are separated the grooved portions thereof will disengage the flange 25, so that the bearing may be removed, if desired. The bearing or journal box 7 is removably secured to the standard 6 in any suitable manner, as by being bolted thereto. The bearings 4 and 7 preferably carry positioning pins 27 adapted to be engaged by lugs 28 projecting from the cage members, whereby the cage members are accurately located when bolted together.

Mounted within the tubular strainer is a conveying and expressing screw 29, projecting from the ends of which are journals 30 and 31, the former of which rotates in boxes 4 and 5 and has secured to it the gear 32 driven by the gear 33 mounted on a power shaft 34. The journal 31 is carried in the journal box 7. The body of the screw is preferably somewhat conical in form, the groove forming the thread being cut much deeper near the end of the machine into which the material is charged. The outer surface of the thread 35 is, however, a portion of a true cylindrical surface, fitting closely within the strainer, but not actually in contact therewith. The pitch of the screw is preferably greater near the charging end of the machine, gradually becoming less and less as the thread forming groove is cut less deeply. The collars 36 and 37 are preferably formed at each end of the threaded portion of the screw, these collars fitting closely within the perforated tube or lining 11 and closing the ends of the latter. It will thus be seen that material fed into the machine through hopper 19 will be picked up by the screw and forced along the chamber, all that part of the material which is capable of passing through the holes 22 being forced out through them, while the remainder of the material is carried to the remote end of the chamber, where it is expressed through the large openings 23.

While, owing to the fact that the perforated strainer area of my machine is great compared with the capacity thereof, and a large part of the material leaves the chamber without being forced the entire length thereof, a dangerous degree of heating is avoided, I prefer to provide means for further reducing the temperature by circulating water through the screw. For this purpose I provide a water-tight swivel connection at each end of the screw, the latter being tubular. The swivel connection preferably comprises a pipe section 38 having a flange 39 on one end and secured to the end of the screw by means of a tubular cap 40 which engages the flange on the end of the pipe section, the cap being flanged and secured to the end of the screw by bolts 41. A stuffing-box 42 is preferably provided, through which the pipe section 38 passes.

By reason of the fact that with my machine all of the material is expressed laterally, the end of the perforated chamber being closed, there is but a very slight end-thrust put upon the screw and its bearings. The stresses in the apparatus are practically balanced. Where the material is forced endwise, as in the shoddy strainers heretofore constructed, the entire force of expressing material is taken up by the bearing of the screw, which is thereby subjected to high stresses and which rapidly wears out. Moreover, as in my machine the material is not forced out of the end of the chamber. I am enabled to provide a suitable bearing for the screw at each end thereof instead of at the charging end only, as heretofore. The screw is thereby supported firmly in position and cannot wabble, as is likely to occur where the screw is supported at its head end only. In shoddy strainers having but a single bearing, this tendency has been so serious that it has been necessary to make the screw fit tightly within the chamber, utilizing the walls of the latter as an additional guide or bearing therefor. This results in an excessive amount of friction and rapidly wears away both the screw and the walls of the chamber. With my construction it is not necessary to have the screw contact with the walls of the chamber, but merely brought close enough thereto to insure proper feeding of the material. The wearing action of the screw upon the interior walls of the chamber would be peculiarly objectionable where these walls are perforated as shown, as burs might be formed, tending to close the small perforations.

I have illustrated and described one specific modification of my invention, but I do not desire to be limited to the exact details thereof, as it is obvious that a variety of changes may be made therein. I need not use all of the novel features of my invention in order to obtain some of the advantages thereof, though I believe that the best results are attained when all of these features are combined in a single machine. The shoddy strainer constructed as above set forth combines large capacity with operation at comparatively low temperature and great economy of power required to operate it, the latter being due mainly to the reduction of thrust and consequent great reduction of friction upon the bearings; also the elimination of friction due to the actual engagement of the screw with the bore of the chamber, and finally to the great reduction of the useless churning action of the screw in the material to be strained. I have found that the power required to operate a machine constructed as above set forth is actually not more than one-third of the power required to operate a machine of the same capacity of the old type, in which the material is forced from the end of the chamber.

Having thus set forth one embodiment of my invention, but without limiting myself to the exact apparatus shown and described, I claim:

1. In a shoddy strainer, in combination, a perforated cylindrical strainer tube having a charge opening near one end thereof, a screw rotatably mounted in said tube of slightly less diameter than the inner diameter of said tube and having cylindrical end portions formed integral therewith fitting within said tube and closing the ends thereof, journals projecting from each end of said screw, bearings for said journals, and means for rotating said screw.

2. In an apparatus of the character described, in combination, a perforated tube, a screw rotatably mounted therein closely fitting the same but out of contact with the walls thereof, a journal projecting from each end of said screw beyond an end of said tube, bearings for said journals, said journals having portions thereof adjacent to each end of said screw closing the ends of said tube, and means for rotating said screw.

3. In apparatus of the character described, in combination, a pair of supports, a beam connecting the same, a journal box mounted upon each of said supports, a pair of reticulated cage members hinged to said beam, a tubular foraminous lining mounted within said cage members, means for securing said cage members together, interlocking means on said journal boxes and cage members, and a screw journaled in said journal boxes and extending through said tubular lining.

4. In apparatus of the character described, in combination, a body member having perforated walls, and a chamber therein, an expressing screw mounted in said chamber having a journal at each end thereof, journal boxes for said journals, one at each end of said body member, and interlocking means on said journal boxes and body member to hold the same together.

5. In apparatus of the character described, in combination, a perforated tubular strainer, a two-part reticulated cage for supporting the same, an expressing screw rotatable in said tubular strainer and having journals projecting from each end thereof, journal boxes for said journals, one mounted at each end of said tubular strainer, and interlocking means on said journal boxes and cage for holding said journal boxes in position.

JOHN R. GAMMETER.

Witnesses:
W. C. STEVENS,
O. E. MELTON.

---

Copies of this patent may be obtained for five cents each, by addressing the "Commissioner of Patents, Washington, D. C."